(12) United States Patent
Hui et al.

(10) Patent No.: US 9,028,154 B2
(45) Date of Patent: May 12, 2015

(54) ADAPTER FOR CLEANING AN OPTICAL JUNCTION AND REDUCING OPTICAL BACK REFLECTION

(71) Applicant: Avago Technologies General IP (Singapore) Pte. Ltd., Singapore (SG)

(72) Inventors: David Chak Wang Hui, Santa Clara, CA (US); Xiaozhong Wang, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 14 days.

(21) Appl. No.: 13/757,715

(22) Filed: Feb. 1, 2013

(65) Prior Publication Data

US 2014/0219619 A1 Aug. 7, 2014

(51) Int. Cl.
*G02B 6/36* (2006.01)
*G02B 6/38* (2006.01)

(52) U.S. Cl.
CPC ............... *G02B 6/36* (2013.01); *G02B 6/3825* (2013.01); *G02B 6/3898* (2013.01); *G02B 6/382* (2013.01)

(58) Field of Classification Search
CPC ........................................................ G02B 6/36
USPC .................................................... 385/58, 134
See application file for complete search history.

(56) References Cited

U.S. PATENT DOCUMENTS

| | | | |
|---|---|---|---|
| 4,991,929 A * | 2/1991 | Bowen et al. ................... 385/50 |
| 5,220,703 A * | 6/1993 | Kanayama et al. .......... 15/210.1 |
| 5,956,793 A * | 9/1999 | Cox .......................... 15/104.002 |
| 6,004,042 A * | 12/1999 | Million et al. .................... 385/59 |
| 6,853,794 B2 * | 2/2005 | Lu et al. ......................... 385/134 |
| 7,566,176 B2 * | 7/2009 | Lytle et al. ....................... 385/85 |
| 8,118,494 B2 * | 2/2012 | Larson et al. .................... 385/60 |
| 2003/0039463 A1 * | 2/2003 | Miyake ......................... 385/147 |
| 2005/0105859 A1 * | 5/2005 | Gerhard .......................... 385/85 |
| 2006/0045428 A1 * | 3/2006 | Theuerkorn et al. ............ 385/53 |
| 2010/0098381 A1 * | 4/2010 | Larson et al. .................... 385/60 |
| 2010/0220960 A1 | 9/2010 | Ohtsuka et al. |
| 2010/0319152 A1 * | 12/2010 | Prizepasniak ................ 15/210.1 |
| 2012/0057841 A1 * | 3/2012 | Wysocki et al. .............. 385/139 |
| 2012/0321255 A1 * | 12/2012 | Kewitsch ........................ 385/78 |
| 2014/0072265 A1 * | 3/2014 | Ott .................................. 385/87 |
| 2014/0124140 A1 * | 5/2014 | Verheyden et al. ........... 156/350 |

OTHER PUBLICATIONS

MPO Connectors, SENKO Advanced Components, XP-MT Ferrule Structure, Senko Advanced Components Inc., available at http://www.senko.com/fiber/pdf_brochure/MPO%20HandOutOKpdfOK.pdf, 2pp.

* cited by examiner

*Primary Examiner* — Kaveh Kianni

(57) ABSTRACT

An adapter includes a housing with opposed openings for receiving a first connector that is mechanically and optically mateable with a second connector to form one or more optical signal communication links. The housing is arranged with a slot for receiving a flexible material having an index of refraction that approximates the index of refraction of aligned pairs of optical fibers. The flexible material is appropriately sized to cover the fibers from each of the connectors. The optical fiber ends of a respective connector can be cleaned by inserting the connector in the adapter and advancing the flexible material. Once the optical fiber ends of both connectors have been cleaned and the flexible material further advanced, the connectors can be reinserted in the adapter to establish an optical signal link between the optical fibers.

20 Claims, 6 Drawing Sheets

ADAPTER FOR CLEANING AN OPTICAL JUNCTION AND REDUCING OPTICAL BACK REFLECTION

BACKGROUND

In an optical communication system, it is frequently necessary to couple a first optical fiber to a second optical fiber. These optical connections or junctions have been achieved with adapters that receive and engage standard connector pairs. In these single fiber connectors, the respective fibers are usually terminated in a ferrule. The ends of the respective fibers are typically cleaned before being arranged in a sleeve within the ferrule. The corresponding sleeves are precisely arranged to guide the ends of the fibers into alignment. Typically, the ferrules are configured to apply a biasing force against respective surfaces of the sleeves to ensure that the ends of the fibers remain in contact. When properly cleaned and arranged, the optical junction achieves acceptable performance levels.

Optical junction quality becomes more important with increasing optical signal data rates. Optical junction quality is defined by insertion loss (attenuation) and return loss (reflection). Insertion loss is the difference in signal power resulting from the optical junction. Return loss is the ratio of incident power to reflected power at the optical junction. Measurements of these parameters are now defined in International Electrotechnical Commission (IEC) standard 61753-1. The standard gives five grades for insertion loss from A (best) to D (worst), and M for multimode. The standard further provides five grades for return loss, with grades from 1 (best) to 5 (worst). Many industry standards include strict limits on return loss and insertion loss introduced by fiber connections.

The results are quite different for multi-fiber push on (MPO) optical junctions. MPO optical junctions include an array of optical fibers precisely located at the end of a ferrule molded from a plastic material. The end of the ferrule is generally polished and the ferrule is arranged to enable a short length of the individual fibers to protrude beyond the face of the ferrule. The MPO optical junctions are completed with male and female connectors. The male version of the connector is arranged with guide pins that extend from the ferrule of the connector. The female version is arranged with alignment holes that closely receive the guide pins. The resulting glass-to-glass contact eliminates signal losses that would be caused by an air gap between the joined fibers. While this arrangement can achieve fiber to fiber alignment and contact there are a number of factors that can prevent the intended alignment and contact between each of the corresponding ends of the optical fibers in a multiple fiber optical junction.

With proper fiber to fiber alignment and contact a return loss of 20 dB (a ratio of power sent over power returned) is easily attainable. In traditional optical networks, an allowable return loss from the entire link is limited to 12 dB minimum. Return losses of less than 12 dB may enhance harmonic modulation distortion and increase noise in the laser light source, which can cause instability and introduce data errors in optical signals. A single glass to air interface produces 14 dB of return loss. A single improper fiber to fiber connection has two glass to air interfaces, and can introduce return loss as small as 10 dB. In addition, an improper connection can introduce interference between a reflected signal and an intended signal which can lead to unpredictable results.

Improper connections can result from a number of factors. For example, manufacturing tolerances in the arrangement of the optical fiber ends in a connector can introduce one or more offsets from a desired arrangement. By way of further example, variations between the polished surface of the ferrule and the internal sleeves or other structures supporting the fibers can lead to unintended variations in the length of the exposed fibers. This can also occur when a polishing step has produced a ferrule that is not flat across the mating surface. In addition, manufacturing tolerances in the size, shape and location of the guide pins and their corresponding holes or recesses in a female connector can lead to misalignment between the corresponding fibers when the ferrules are coupled. Moreover, particles of ferrule material or foreign material can remain on the ferrule surface. While it is standard practice to clean the ferrule surface it is sometimes difficult to remove dirt near the base of the alignment pins. Any of the mentioned factors can prevent a consistent fiber to fiber contact for one or more of the optical junctions.

A conventional (male) ferrule with guide pins is illustrated in a top plan view and a side elevation view in FIG. 1A. The conventional ferrule 1 includes a base 3 with guide pins 2 extending beyond a polished face 5 of the base 3. Optical fibers 4 traverse the base 3 and extend beyond the polished surface 5 about 1 to 5 μm. A conventional (female) ferrule with recesses arranged to receive the guide pins 2 is illustrated in a top plan view and a side elevation view in FIG. 1B. The conventional ferrule 10 includes a base 13 with recesses 12 extending from an opening in a polished face 15 into the base 13. Optical fibers 14 traverse the base 13 and extend beyond the polished surface 15 about 1 to 5 μm.

FIG. 2 illustrates an improper arrangement of the ferrule 1 with the ferrule 10 introduced in FIGS. 1A and 1B in a side elevation view. As shown in FIG. 2, when the conventional ferrule 1 is in registration and close arrangement with the ferrule 10, i.e., when the guide pins 2 of the ferrule 1 are inserted in the corresponding recesses 12 in the ferrule 10, debris 20 having a dimension greater than about 2-10 μm between the polished face 5 and the polished face 15 results in an unintentional gap 25 between optical fiber 4 and optical fiber 14. The resulting gap introduces an abrupt change in the refractive index in the signal path supported by the respective optical fiber pairs. Such abrupt changes in the refractive index of the light path generates a reflection R defined by equation 1 below:

$$R = \frac{(n_1 - n_g)^2}{(n_1 + n_g)^2} \quad \text{Equation (1)}$$

where, $n_1$ is the refractive index of the material used to manufacture the optical fiber and $n_g$ is the refractive index of air. The reflected light decreases the amount of transmitted light. Since the gap introduces reflective interfaces at the surface of each fiber, the minimum loss to the transmitted light T in each of the separate light paths is defined by equation 2.

$$T = 1 - 2R = 1 - \frac{2(n_1 - n_g)^2}{(n_1 + n_g)^2} \quad \text{Equation (2)}$$

Insertion loss, which is additive to the loss in transmitted light due to the reflections, is dependent on the distance of separation between the corresponding fiber pairs.

Various tools have been developed in an attempt to address cleanliness at the termination of an optical fiber. For example, U.S. Pat. No. 5,956,793 discloses an optical fiber cleaning tool that includes a strip of adhesive tape within a housing of the tool. The tool includes a latch for releasably attaching the tool to a connector with installed optical fibers. While an adhesive tape is somewhat effective for capturing undesired debris, any adhesive that adheres to the ferrule or ferrules that is not removed by a secondary cleaning step can lead to other debris becoming attached to surfaces that can lead to gaps between fiber pairs.

U.S. Patent Application Publication No. 2003/0039463 discloses a tool for cleaning a single fiber optical connector. The tool includes a cleaning sheet in a housing and a guide member that directs the single fiber optical connector at an angle such that the exterior surface of the fiber is parallel to the cleaning sheet when the connector is inserted in the tool.

In many data centers, optical networks are supported by trunks of parallel fibers with MPO optical junctions. A typical communication link between server computers may be supported by two or more MPO optical junctions. The conventional connection systems, cleaning tools, and commercial systems for quickly terminating a ribbon fiber do not address the above-described issues which prevent achievement of consistent optical coupling between multiple optical fibers at an optical junction. Thus, as the number of such multiple fiber optical junctions increases in a communication link, signal integrity within the network supported by such links is at increased risk.

SUMMARY

The present invention introduces a formable, transparent material between adjacent light transmitting media to reduce back reflection into the same. An embodiment of the present invention relates to an adapter having a housing with a first connector mating portion and a second connector mating portion. The respective mating portions form opposed openings for receiving a first optical connector and a second optical connector. The housing is further arranged with a slot for receiving a flexible material having an index of refraction that approximates the index of refraction of aligned pairs of optical fibers in the optical connectors. The flexible material is appropriately sized to cover at least the tips of the fibers from each of the connectors. A holder is arranged on a first side of the housing. The holder provides a supply of the flexible material to the slot. A structure is provided on a second or opposed side of the housing to support an end portion of the flexible material.

In an exemplary embodiment, a method for cleaning an optical port of an optical connector is disclosed. The method includes the steps of providing an adapter having a first opening arranged to receive an optical port end of a first optical connector, the adapter including a second opening opposed to the first opening, the second opening arranged to receive an optical port end of a second optical connector, the housing forming a slot that extends from a first surface to an opposed surface of the housing, the slot having a sheet of flexible material arranged therein, inserting the optical port end of the first optical connector into the first opening such that the optical port end contacts the flexible material and advancing the flexible material along the optical port end of the first optical connector.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The adapter and methods for cleaning an optical port of an optical connector can be better understood with reference to the following drawings. The components in the drawings are not necessarily to scale, emphasis instead being placed upon clearly illustrating the principles of the present invention.

DETAILED DESCRIPTION

Figure 1A:
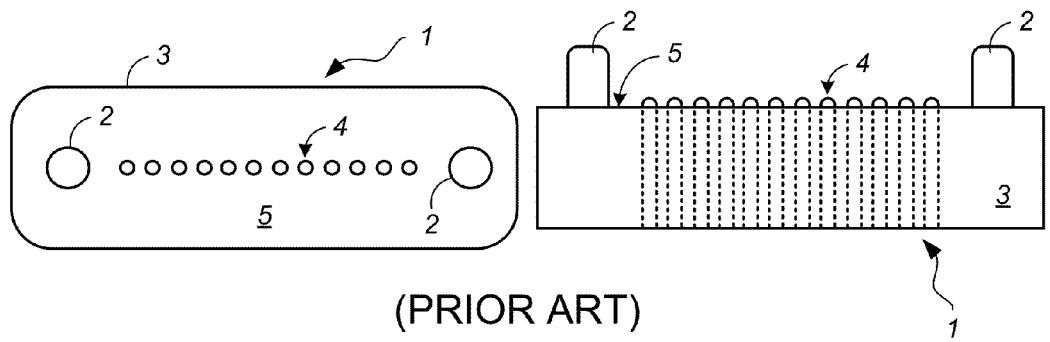
FIG. 1A is a top plan view and a side elevation view showing a conventional ferrule with guide pins.
Figure 1B:
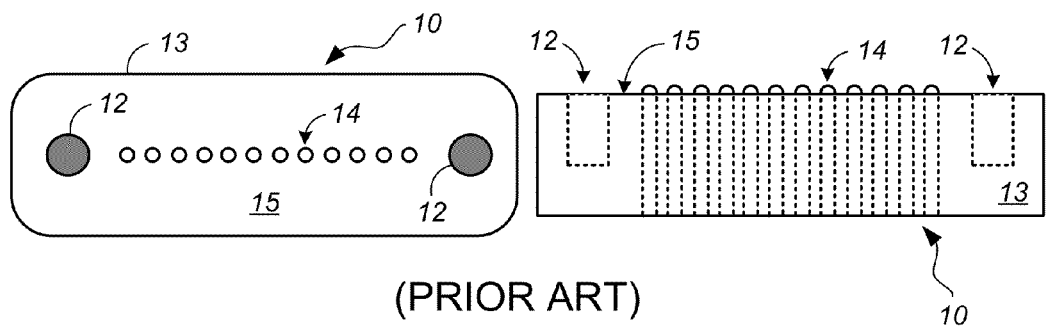
FIG. 1B is a top plan view and a side elevation view showing a conventional ferrule with guide holes.
Figure 2:
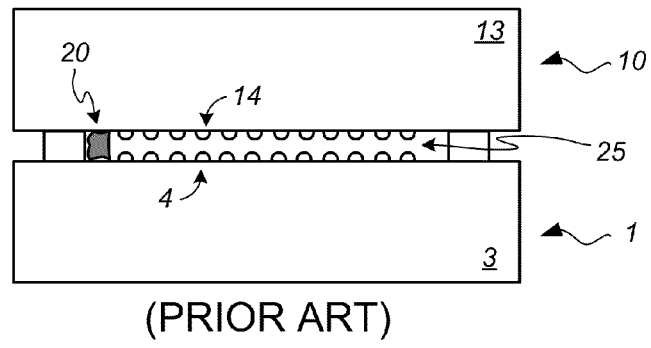
FIG. 2 illustrates an improper arrangement of the conventional ferrules introduced in FIGS. 1A and 1B in a side elevation view.

The described issues with consistently achieving suitable fiber to fiber contact for one or more of the optical junctions in a multiple fiber optical connector, as exemplified in the state of the art, are addressed by the adapter and methods for cleaning an optical port of an optical connector of which example embodiments are described below.

As briefly described above, an adapter is arranged with features that enable a technician to remove debris from the optical port or connecting face of the ferrule of an optical connector before completing an optical junction. The adapter includes a housing with first and second opposed ports for receiving respective optical connectors. The adapter forms an opening in the housing in which a sheet of flexible material is introduced across the interior cavity of the housing. A holder is provided along a surface of the adapter. The holder supports a supply of the flexible material. In an embodiment, the holder is arranged to support a spindle upon which a length of the flexible material is stored by rolling the flexible material about the spindle. The flexible material is made from a transparent, flexible and compliant material having an index of refraction that approximates the index of refraction of the optical medium in the first and second connectors. The flexible material enters the housing through a slot in a first surface and exits the housing through a corresponding slot formed in a second surface of the housing opposed to the first surface. A structure is provided on the second surface of the adapter. The structure supports an end portion of the flexible material. In an embodiment, a clip can be applied to external surfaces of the structure above the end portion of the flexible material to prevent the flexible material from reentering the cavity within the housing.

The flexible material can be a sheet of polyethene or other suitable materials such as polytetrafluoroethylene (Teflon®) or a polyimide film (Kapton®). Teflon and Kapton are registered trademarks of the E.I. Du Pont De Nemours and Company of Wilmington, Del., U.S.A.

In alternative embodiments, the flexible material can be constructed of multiple layers or the surfaces treated and arranged in a sheet that remains flexible enough to resist tearing, or cracking as it is rolled onto a spindle. However, the materials and treatments should result in an optically transparent material absent significant discontinuities or variance in the refractive index. The flexible material is optically transparent at a wavelength or a range of wavelengths of interest. For example, the wavelength of interest for optical junctions constructed of multimode fibers is about 850 nm. Preferably, the material has a thickness of between about 5 μm to 125 μm. If the flexible material is too thin, e.g., less than about 5 μm thick, it will be difficult to fill potential gaps caused by uneven polishing or debris between the exposed ends of the optical fibers and or on one or both polished surfaces of respective ferrules forming an optical junction. In addition, if the flexible material is too thin it may unintentionally tear or lead to difficulty contacting and removing debris from the optical port of a connector. If the flexible material is too thick, e.g., more than about 125 μm, then insertion loss would prevent an optical link with multiple optical junctions from meeting many communication standards for signal loss over the link. Preferably, the flexible material is compressible such that it forms around exposed ends of fibers that may extend from the polished surface of a ferrule. In addition, the flexible material should be durable when exposed to temperature ranges and variation typically encountered in network switching centers, as well as resistant to other environmental elements or characteristics in such centers.

The first optical connector and the second optical connector can be mechanically coupled via insertion into the respective connector mating portions of the housing. The first optical connector and the second optical connector are optically coupled via the flexible material in the slot that traverses the housing. The ferrules of the first optical connector and the second optical connector are mechanically and optically mateable with each other by plugging one of them into the other (e.g., one is plug-like, and the other is socket-like) within the housing. As the first optical connector and second optical connector approach a fully mated position, a first optical connector optical port and a second optical connector optical port approach optical alignment with one another along an approach path. In an exemplary embodiment, the approach path is a straight line, corresponding to the direction in which the first and second connectors are plugged together as guided by the inner surfaces of the first connector mating portion and second connector mating portion of the housing. In the fully mated position, the first optical connector optical port is optically aligned with the second optical connector optical port. In addition, the mating surfaces of the respective ferrules are both mechanically coupled to one another. Moreover, respective external surfaces of the first optical connector and the second optical connector are mechanically coupled to each other via the adapter.

Either of the first optical connector or the second optical connector can be inserted in the adapter and the optical port thereof cleaned by advancing the supply of flexible material across the mating or optical surface of the respective ferrule. Thereafter, the optical connector can be unlatched from the housing and the process can be repeated for the remaining optical connector. Once any undesired debris is removed from the optical ports of both optical connectors, the flexible material can be advanced a desired amount to ensure that other contaminants or additional debris are not reintroduced in the space adjacent the optical ports.

Introducing and advancing a flexible material in the slot of the housing of the adapter in this manner when an optical connector is engaged in the housing can remove contaminants and thus promote significantly improved optical signal characteristics between a first optical connector optical port and a second optical connector optical port.

An adapter in accordance with the present invention can be deployed to achieve easy cleaning before mating optical connectors. When properly used, the adapter reduces the frequency of link failures that result from optical signal reflection at an optical junction.

As indicated in Equation 1, when the refractive index of an optical fiber that encounters an air gap is 1.482, the reflected signal energy is $$R = \left(\frac{1.482 - 1.000}{1.482 + 1.000}\right)^2 = 0.0377 \Rightarrow -14.2 \text{ dB}.$$

In accordance with the present invention, when the refractive index of the flexible material introduced in the housing between the optical ports of the respective optical connectors is 1.495 for light having a wavelength of 850 nm, the reflected signal energy is $$R = \left(\frac{1.482 - 1.495}{1.482 + 1.495}\right)^2 = 0.0000191 \Rightarrow -47.2 \text{ dB}.$$

Having generally described an adapter and a method for cleaning an optical port of a connector, illustrative embodiments of an adapter consistent with the present invention and a method for cleaning an optical port of an optical connector as shown in the drawings are described in detail below.

Figure 3:
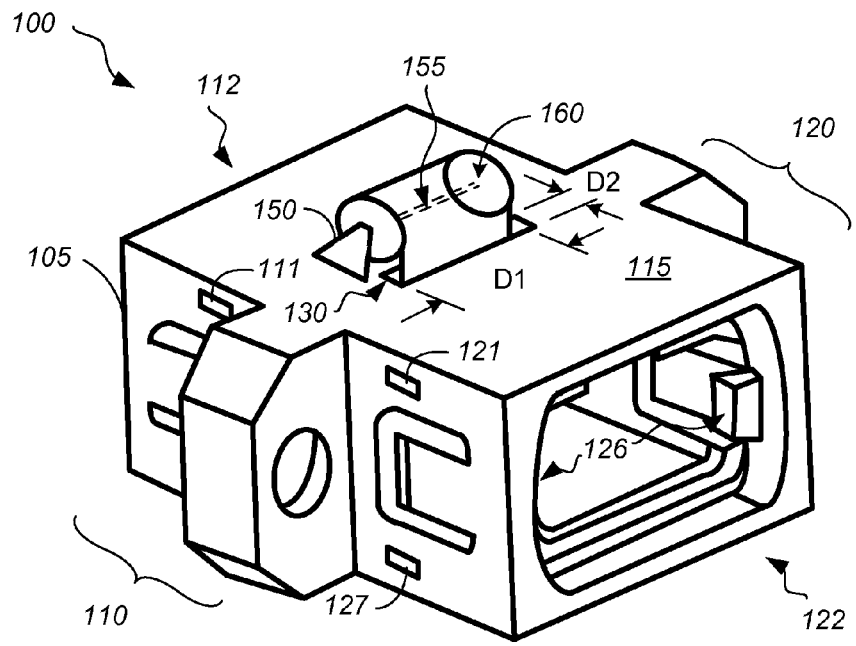
FIG. 3 includes a first perspective view of an adapter in accordance with an exemplary embodiment of the invention.
Figure 4:
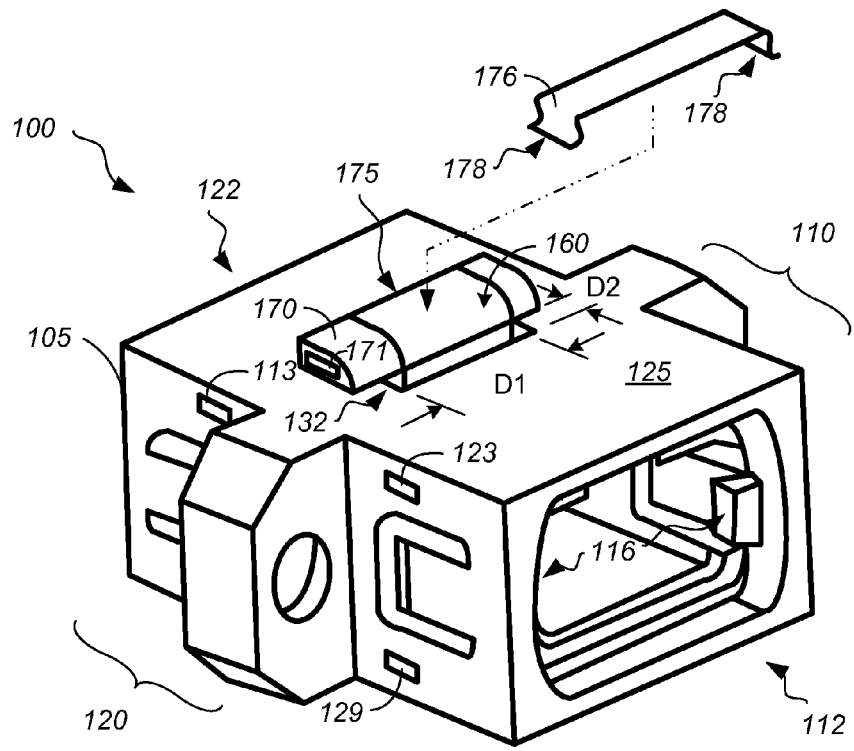
FIG. 4 is an opposed perspective view of an adapter in accordance with an exemplary embodiment of the invention.

In accordance with the invention, and as illustrated in the exemplary embodiment shown in FIG. 3 and FIG. 4, a connection and cleaning system or adapter 100 includes a housing 105 with a first connector mating portion 110 and a second connector mating portion 120. The first connector mating portion 110 forms an opening 112 with features arranged to receive an optical connector with complementary features to surfaces within the opening 112. The second connector mating portion 120 forms a second opening 122 opposed to opening 112. The opening 122 includes features arranged to receive an optical connector with complementary features to surfaces within the opening 122. The optical connectors (not shown) include features complementary to each other that enable at least one fiber end from a first connector to be arranged in close alignment with a respective fiber end from a second connector when the connectors are introduced and brought together within the adapter 100.

The housing 105 forms a third opening 130 or slot that extends from a first surface 115 into an interior cavity of the housing 105. An opposed opening 132 or slot extends from a second surface 125 into the interior cavity of the housing 105. The slot 130 is arranged to receive a supply of flexible material 160 arranged on a holder 150 along the first surface 115 of the housing 105. In the illustrated embodiment, the supply of flexible material 160 is rolled on a spindle, cylinder or pin 155 that is supported by the holder 150.

The second surface 125, as shown in FIG. 4 includes a structure 170 arranged to support an end portion of the flexible material 160 that traverses the housing 105. The structure 170 includes an edge 175 suitable for cutting a desired length of the flexible material 160. A clip 176 shown separate from the housing 105 can be closely arranged above the structure 170 with the end portion of the flexible material 160 between clip 176 and the surface of the structure 170. Tabs 178 arranged at opposed ends of the clip 176 engage corresponding recesses 171 along sides of the structure 170.

In the illustrated embodiment, the slot 130 and the slot 132 share similar dimensions and are arranged such that an optical port of the respective ferrules of connectors introduced within the adapter will be in alignment with the flexible material 160 as it traverses the cavity within the housing 105. As indicated, the slot 130 and the slot 132 have a length D1 that is longer than a width ($W_M$ of FIG. 8B) of a sheet of the flexible material 160 and a width D2 that is greater than a thickness ($t_M$ of FIG. 8A) of the flexible material 160. It should be understood that the slot 130 and the slot 132 may be arranged with different dimensions or shapes as long as the flexible material 160 can traverse the cavity of the housing 105.

As shown in FIG. 3, opposed tabs 126 are provided in the second opening 122 for contacting and engaging a complementary structure on the surface of an optical connector (not shown). Similarly, as shown in FIG. 4, opposed tabs 116 are provided in the first opening 112 for contacting and engaging a complementary structure on the surface of an optical connector (not shown).

When a first connector is introduced in the first opening 112 and engaged by the opposed tabs 116 and a second connector is introduced in the second opening 122 and engaged by the opposed tabs 126, optical ports (820, 830 of FIG. 8A and FIG. 8B) on mating surfaces of ferrules (815, 825 of FIG. 8A and FIG. 8B) of the respective connectors contact opposed surfaces (161, 163 of FIG. 8A) of the flexible material 160 arranged within the housing 105. When engaged in this manner the combination completes an optical junction defined by the sum of the lengths of the optical fibers terminated in the respective connectors.

Figure 5:
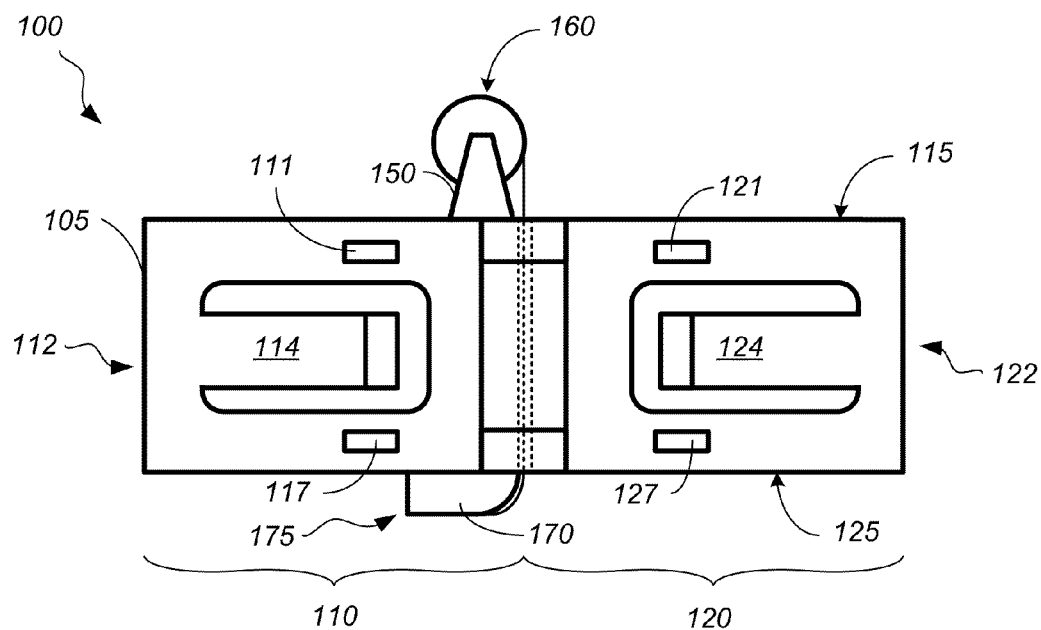
FIG. 5 is a side elevation view of the adapter of FIG. 3 and FIG. 4.

FIG. 5 is a side elevation view of the adapter of FIG. 3 and FIG. 4. As indicated in FIG. 5, the first connector mating portion 110 includes opening 111 and opening 117 along a frontward facing surface of the housing 105. The first connector mating portion 110 is further arranged with similar openings on the backward facing side of the housing 105 obscured in the perspective view of FIG. 3. One of the similar openings, opening 113 can be observed in FIG. 4. Similarly, the second connector mating portion 120 includes opening 121 and opening 127 along a frontward facing surface of the housing 105 as shown in FIG. 3. The second connector mating portion 120 is further arranged with similar openings on the backward facing side of the housing 105. These openings include opening 123 and opening 129 as can be observed in FIG. 4.

Armature 114, e.g., a sheet metal spring, arranged near the front facing surface of the first connection portion 110 of the housing 105 extends slightly outside the body of adapter 100. The armature 114 can be used to hold the adaptor 100 to a corresponding opening on a chassis or panel of a communication system. A similarly configured armature is arranged along the first connection portion 110 on the opposed side of the housing 105.

Armature 124, e.g., a sheet metal spring arranged near the front facing surface of the second connection portion 120 of the housing 105 extends slightly outside the body of the adapter 100. The armature 124 can be used to hold the adaptor 100 to a corresponding opening on a on a chassis or panel of a communication system. A similarly configured armature is arranged along the second connection portion 120 on the opposed side of the housing 105.

Figure 6:
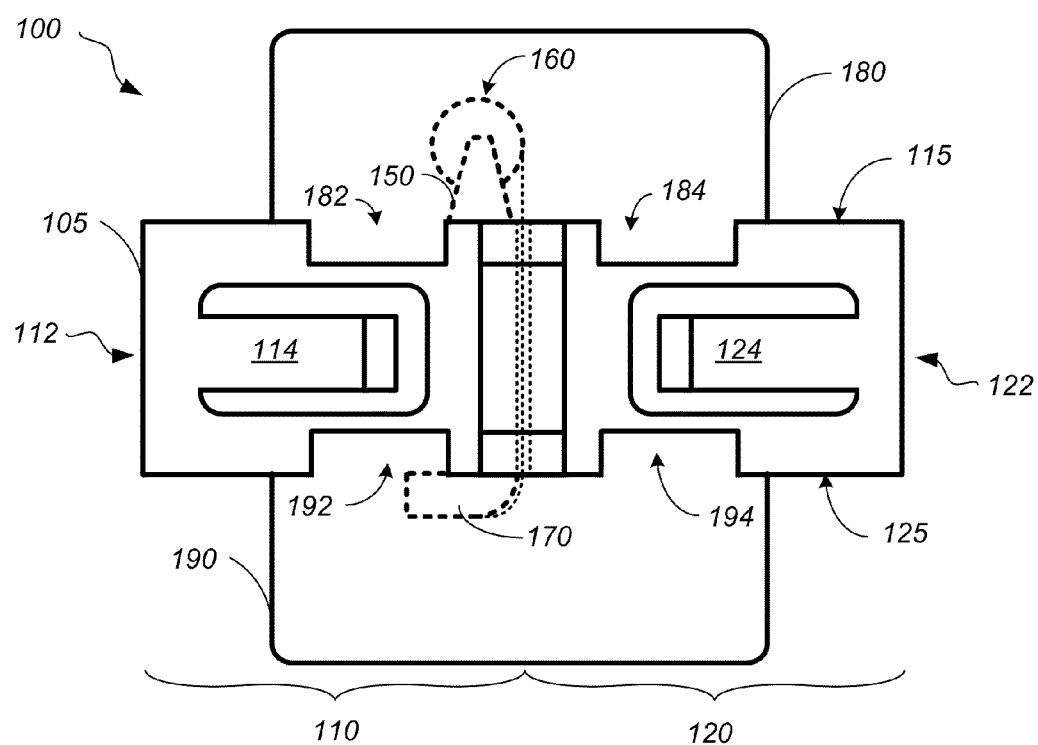
FIG. 6 is a side elevation view of an embodiment of the adapter of FIG. 5 with respective covers.

FIG. 6 shows a cover 180 arranged above the surface 115. The cover 180 includes tab 182 and tab 184. Tab 182 includes an obscured structure arranged to engage opening 111. Tab 184 includes an obscured structure arranged to engage opening 121. Additional tabs (obscured from view in FIG. 6) are provided on the opposed side of the cover 180 to engage openings on the opposed side of the housing 105. In this manner the holder 150 supporting the supply of flexible material 160 and the slot 130 can be protected from contamination. FIG. 6 further shows cover 190 arranged along the surface 125. The cover 190 includes tab 192 and tab 194. Tab 192 includes an obscured structure extending from an inner surface and arranged to engage opening 117. Tab 194 includes an obscured structure arranged to engage opening 127. Additional tabs (obscured from view in FIG. 6) are provided on the opposed side of the cover 190 to engage opening 123 and opening 129. In this manner the structure 170 supporting the end portion of the flexible material 160 and the slot 132 is protected from contamination.

Figure 7:
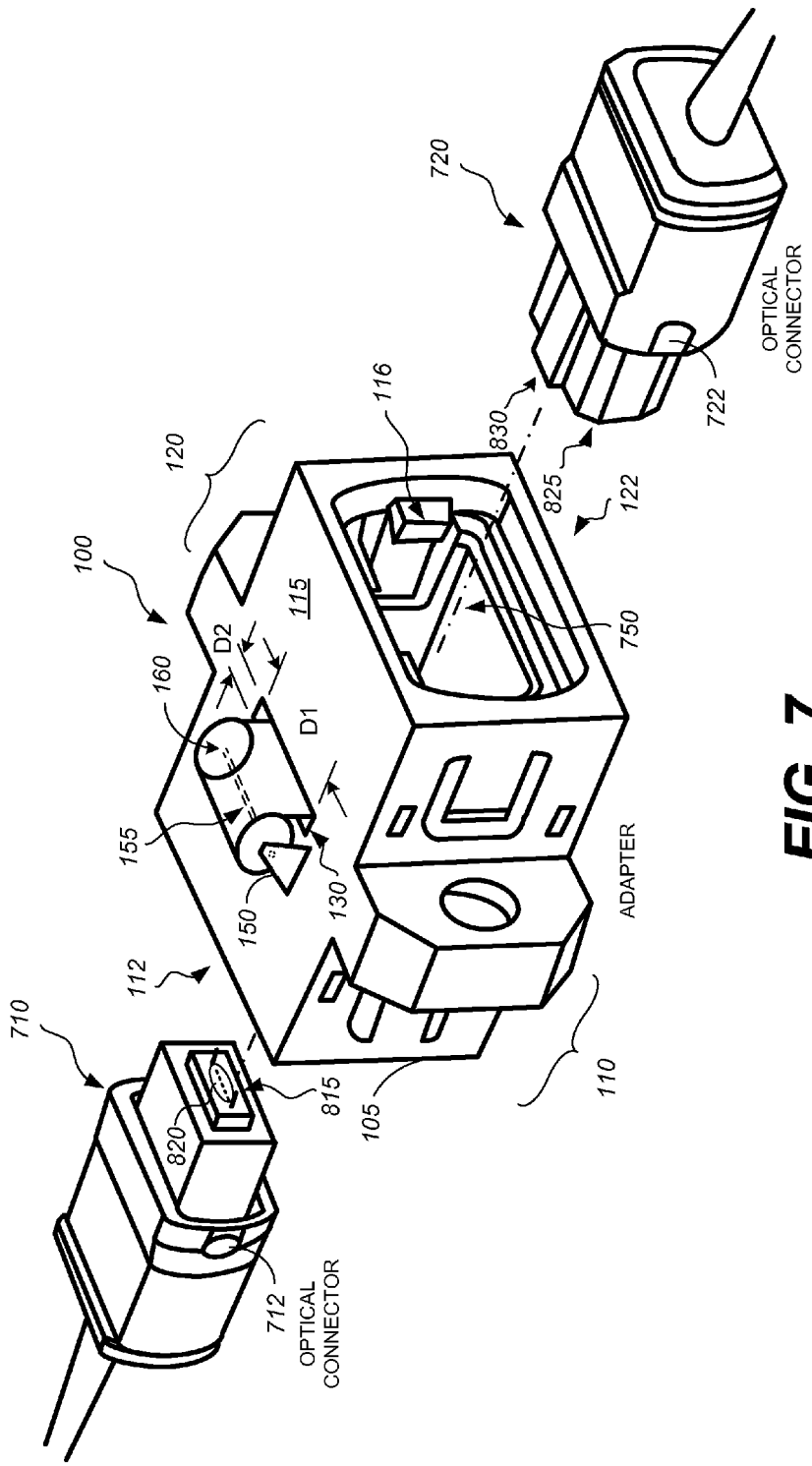
FIG. 7 is a perspective view of the adapter of FIG. 3 in close arrangement with MPO connectors.

FIG. 7 is a perspective view of the adapter 100 of FIG. 3 in close arrangement with MPO connectors. A first connector 710 includes a connector housing with opposed flanges 712 arranged to engage tabs 116 within the opening 112 to mechanically couple the connector 710 to the first connection portion 110 of the adapter 100. The first connector 710 supports a ferrule 815. Ferrule 815 includes an optical port surface 820 with guide pins extending therefrom. The optical port surface 820 includes a set of openings suitably arranged to receive ends of respective optical fibers. A second connector 720 includes a connector housing with opposed flanges 722 arranged to engage tabs 126 within the opening 122 to mechanically couple the connector 720 to the second connection portion 120 of the adapter 100. Ferrule 825 includes an optical port surface 830 with recesses arranged to receive the guide pins extending from ferrule 815 of connector 710. The optical port surface 830 of the second connector 720 also includes a set of openings suitably arranged to receive ends of respective optical fibers. As indicated in FIG. 7, the first connector 710 can be inserted into opening 112 of the housing 105 by translating one, the other or both of the adapter 100 or the first connector 710 along the approach path defined by axis 750. Similarly, the second connector 720 can be inserted in the opening 122 of the housing 105 by translating one, the other or both of the adapter 100 or the second connector 720 along axis 750.

Figure 8A:
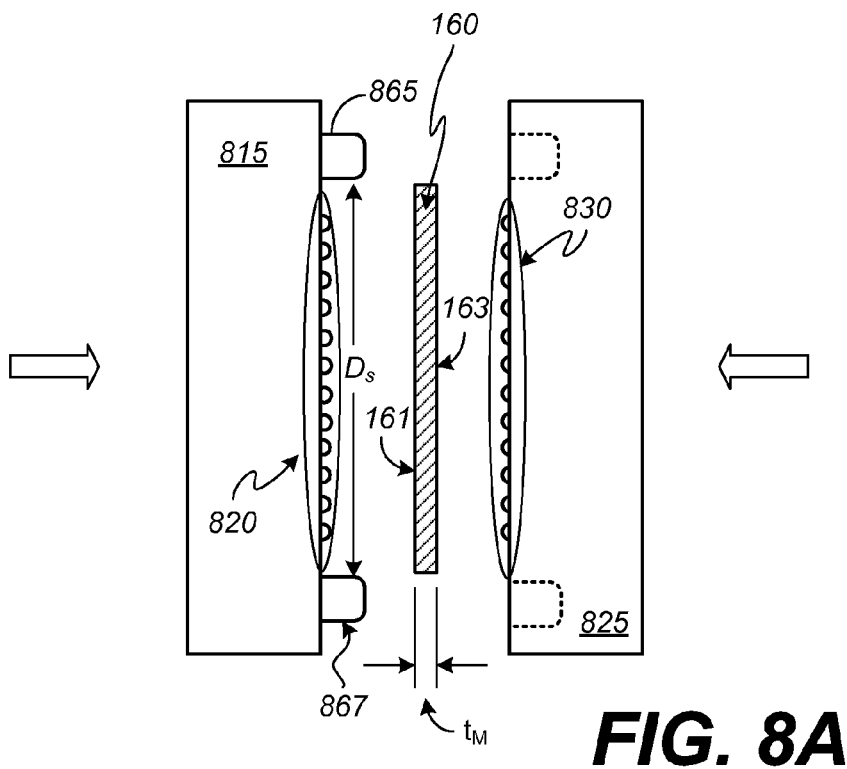
FIG. 8A illustrates ferrules of the MPO connectors in close arrangement with the flexible material that traverses the adapter of FIG. 3 with the adapter removed.
Figure 8B:
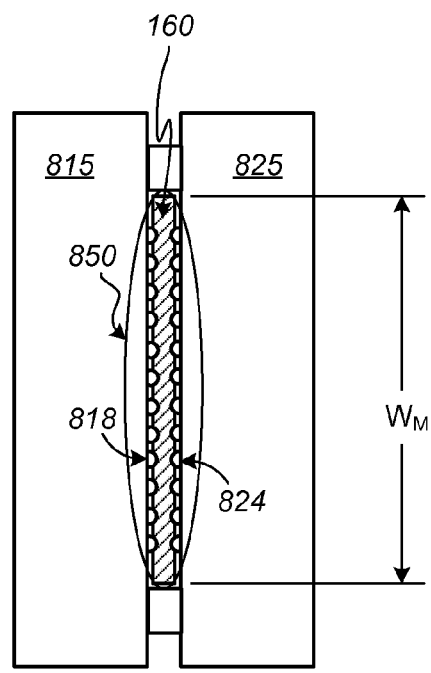
FIG. 8B illustrates the ferrules of the MPO connectors in arrangement with the flexible material to provide an improved optical junction.

FIG. 8A shows the ferrule 815 of the first connector 710 and ferrule 825 of the second connector 720 in close arrangement with the flexible material 160 with the housing 105 removed from view. As shown, optical port surface 820, arranged along the polished face of ferrule 815, approaches surface 161 of the flexible material 160 within the housing 105. Similarly, optical port surface 830, arranged along the polished face of ferrule 825, approaches surface 163 of the flexible material. The arrows indicate a plug-in direction or direction of an external force applied via the corresponding connector housing that will result in the formation of an optical junction 850 as illustrated in FIG. 8B. The optical junction 850 is generated when the exposed optical fibers from ferrule 815 contact surface 161 and the exposed optical fibers from ferrule 825 contact surface 163 of the flexible material 160. As indicated above, the flexible material 160 is transparent to light over a range of preferred wavelengths and has a refractive index that is substantially equal to that of the material used to make the optical fibers in the ferrule 815 and the ferrule 825.

As further indicated in the illustrated embodiment, the flexible material 160 is compressible and deflects under compression from each of the exposed optical fibers. In operation, a modulated light signal transmitted in fiber 818 or in fiber 824 is optically coupled to the other fiber end with reduced insertion loss and a substantially reduced return loss when compared to light paths formed by optical connections with debris between the optical ports of complementary ferrules or surface variations across one or both polished faces of complementary ferrules. It will be understood that respective light signals will be optically coupled by the flexible material 160 for each pair of optical fiber ends optically coupled across the optical junction 850. It will be further understood that the flexible material 160 can be modified as may be required to optically couple other arrangements of optical fibers including those containing multiple rows.

Figure 9:
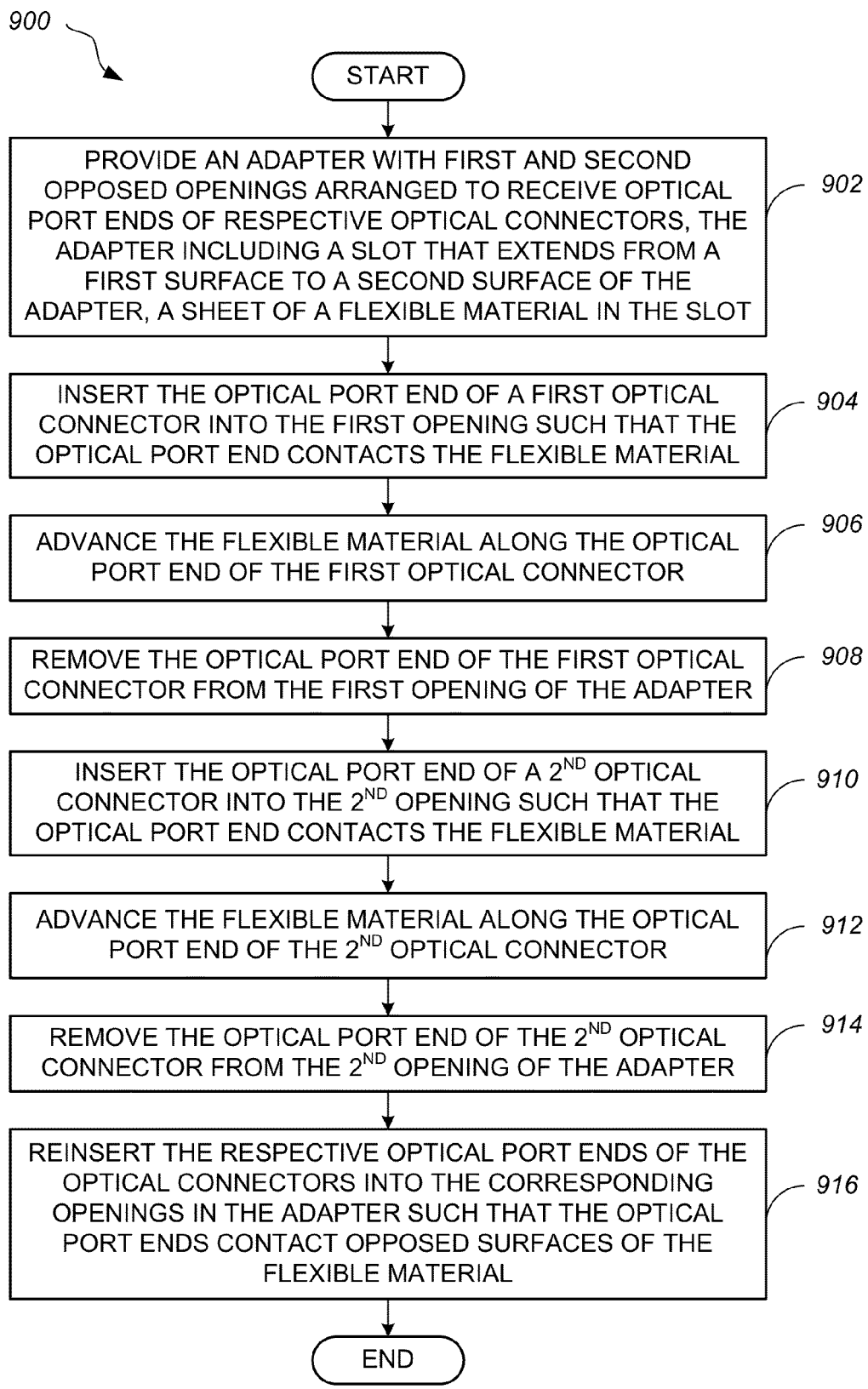
FIG. 9 illustrates a flow diagram including an embodiment of a method for cleaning optical connectors before they are mated in the adaptor.

FIG. 9 illustrates a flow diagram including an embodiment of a method for cleaning an optical port of an optical connector and for reducing optical back reflection at the optical junction. As described above, this is accomplished by introducing a flexible and compressible material that is transparent to light within a select range of wavelengths. To clean debris from an optical port of a connector, an operator brings the optical port and the material together and moves the material while the material and a ferrule or mating surface of the optical port contact each other. Upon completion of such movement, an optical junction with reduced return loss is arranged by bringing separate optical connectors in registration with each other such that the respective optical ports contact opposing surfaces of the material.

As illustrated in FIG. 9, method 900 begins with block 902 where an adapter with opposed openings arranged to receive optical port ends of respective optical connectors is provided. The adapter includes slots in opposed surfaces. A sheet of flexible material is introduced in the interior of the adapter. The sheet enters via one of the opposed surfaces and exits via the other surface. Method 900 continues with block 904 where an optical port of a first connector is inserted in one of the openings such that the optical port contacts the flexible material. As shown in the illustrated embodiments, the flexible sheet has a width that entirely spans the exposed fibers of the optical port and that is nearly the same as the distance between guide posts in a male connector to be mechanically and optically coupled to a complementary female connector in the adapter. In block 906, the flexible material is advanced across the optical port of the connector. Thereafter, in block 908, the optical connector is removed from the adapter.

In block 910 an optical port of a second connector is inserted in the remaining opening such that the optical port contacts the flexible material from the opposed side. As shown in the illustrated embodiments, the flexible sheet has a width that entirely spans the exposed fibers of the optical port. In block 912, the flexible material is advanced across the optical port of the connector. Thereafter, in block 914, the optical connector is removed from the adapter. The removal of debris from the optical ports having been completed, the method 900 continues with block 916 where the optical connectors are reinserted into corresponding openings in the adapter such that the respective optical ports contact opposed surfaces of the flexible material that traverses the interior volume of the adapter.

Alternatively, once the functions described in association with blocks 902-912 have been performed, the first connector can be reinserted into the adapter to generate an optical junction between the corresponding fiber pairs of the respective optical ports of the first and second connectors.

It should be noted that although in the exemplary embodiment first connector 710 is plug-like and second connector 720 is socket-like, such that protruding guide pins of the first connector 710 can be inserted into recesses of the second connector 720, in other embodiments the features described herein as those of first connector 710 can instead be provided in a socket-like first connector, and conversely, the features described herein as those of second connector 720 can instead be provided in a plug-like second connector. Structural limitations should not be inferred into such other embodiments as long as the connector has structures complementary to one of the first connection portion 110 or the second connection portion 120 of the adapter 100.

It should be noted that the use of the terms to describe the location or position of the holder 150 and the structure 170 with respect to the housing 105 and the flange 712 or the flange 722 with respect to first and second connector housings are used for purposes of convenience, as the holder 150 and the structure 170 may be perceived as located "on" or integral to the adapter 100 just as the flange 712 or the flange 722 with respect to the connectors may be considered as located "on" or integral to the respective housing. It should be further noted that tabs 116 described as being in the opening 112 and tabs 126 described as being in the opening 122, may have surfaces or features that are flush with a surface or extend beyond a surface of the housing 105.

The use herein of the term "in" with regard to the relationship between two elements in the exemplary embodiment is intended to include the term "on" within its scope of meaning, unless stated or clearly indicated otherwise. Conversely, the use herein of the term "on" with regard to the relationship between two elements in the exemplary embodiment is intended to include the term "in" within its scope of meaning, unless stated or clearly indicated otherwise.

Although in the exemplary embodiment the first connection portion 110 and the second connection portion 120 are arranged to receive MPO connectors, in other embodiments they can have other suitable shapes for closely receiving portions of other connector styles.

Note that in the exemplary embodiment each of the connectors approaches the other along axis 750. However, other embodiments (not shown) are contemplated in which an approach path is not aligned with the plugging direction. For example, a connector having a cam-like mechanism can cause two optical ports to approach each other along a path that is oblique to or laterally offset from the plugging direction or along a non-linear path. So long as a wiping cleaner is located across the approach path, the shape of the approach path or relation between the approach path and plugging direction does not impede the wiping or cleaning action.

Illustrative embodiments of an adapter and methods for cleaning an optical port of an optical junction and for reducing optical back reflection have been described above. However, it is to be understood that the invention is defined by the appended claims and is not limited to the specific embodiments described.

What is claimed is:

1. An adapter, comprising:
a housing having a first connector mating portion and a second connector mating portion, the housing having a first opening in a first end of the first connector mating portion, the first opening arranged to receive a first optical connector, a second opening in a first end of the second connector mating portion, the second opening opposed to the first opening and arranged to receive a second optical connector, the housing forming a third opening and a fourth opening arranged on opposed walls of the housing between the first connector mating portion and the second connector mating portion;
a holder coupled along a first exterior surface of the housing, the holder arranged to provide a supply of a flexible material through the third opening, the flexible material having an index of refraction that approximates a respective index of refraction of the optical medium in the first and second optical connectors; and a structure coupled along a second exterior surface of the housing, the second exterior surface opposed to the first exterior surface of the housing, the structure arranged to support an end portion of the flexible material that exits the housing from the fourth opening, wherein a surface of one of the first optical connector or the second optical connector is cleaned by contacting and advancing the supply of flexible material across the surface, wherein upon completion of such movement an optical junction is formed.

2. The adapter of claim 1, wherein the first optical connector and the second optical connector are mechanically coupled to each other via the adapter and optically coupled to each other within the housing by inserting the first optical connector and the second optical connector into respective connector mating portions such that respective optical ports of the first optical connector and the second optical connector approach alignment with one another along an approach path as the first optical connector and the second optical connector approach a fully mated position.

3. The adapter of claim 2, wherein the respective optical ports of the first optical connector and the second optical connector complete an optical communication link that traverses the flexible material.

4. The adapter of claim 1, wherein the housing is arranged with respective surfaces within the first opening and the second opening for engaging corresponding surfaces of the first optical connector and the second optical connector, such that the optical port of the first connector contacts a first surface of the flexible material and such that the optical port of the second connector contacts an opposed surface of the flexible material.

5. The adapter of claim 1, wherein the third opening defines a first distance that is greater than a separation distance between alignment pins in one of the optical connectors.

6. The adapter of claim 5, wherein the third opening defines a second distance that is greater than a thickness of the flexible material.

7. The adapter of claim 1, further comprising:
a first cover coupled to the housing and substantially surrounding the supply of the flexible material and the third opening above the first surface.

8. The adapter of claim 7, further comprising:
a second cover coupled to the housing and substantially surrounding the structure on the second surface and the third opening through the second surface.

9. The adapter of claim 1, wherein the holder supports a spindle arranged above and substantially parallel with the first exterior surface of the housing to advance the supply of flexible material through rotation.

10. The adapter of claim 1, wherein the third opening defines a first distance that is at least as long as a separation distance between alignment pins in one of the optical connectors.

11. The adapter of claim 9, wherein the spindle rotates to advance the flexible material through the interior of the housing.

12. The adapter of claim 9, wherein the flexible material is coupled to the spindle.

13. The adapter of claim 1, further comprising:
a first cover with a first tab that engages a first recess in the housing, the first cover arranged to prevent debris from contaminating the flexible material or from entering the housing.

14. The adapter of claim 13, wherein the first cover includes multiple tabs arranged to engage respective recesses in the housing.

15. The adapter of claim 13, further comprising:
a second cover with a respective tab that engages a respective recess arranged on an opposed side of the housing, the second cover arranged to prevent debris from entering the housing.

16. The adapter of claim 15, wherein the second cover includes multiple tabs that engage respective recesses in the housing.

17. The adapter of claim 1, wherein the flexible material is compressible.

18. The adapter of claim 1, arranged to engage multiple-fiber push-on/pull-off fiber optic connectors.

19. A housing of an adapter, comprising:
a first connector mating portion having a first opening in a first end of the first connector mating portion, the first opening arranged to receive a first optical connector, the first connector mating portion including first armatures that mechanically engage corresponding first flanges of the first optical connector;

a second connector mating portion opposed to the first connector mating portion, the second connector mating portion having a second opening in a first end of the second connector mating portion, the second opening arranged to receive a second optical connector, the second connector mating portion including second armatures that mechanically engage corresponding second flanges of the second optical connector, wherein the first connector mating portion and the second connector mating portion form a first slot in a first surface of the housing and an opposed slot in an opposed surface of the housing;

a holder arranged along the first surface of the housing, the holder supporting a rolled sheet of a flexible material, the flexible material having an index of refraction that approximates a respective index of refraction of an optical medium in the first and second optical connectors; and a structure arranged along the opposed surface of the housing, the structure arranged to support an end portion of the sheet of flexible material, wherein a surface of one of the first optical connector or the second optical connector is cleaned by advancing the sheet of flexible material from the first slot through the housing and across the surface of the optical connector.

20. The adapter of claim 19, wherein the first optical connector and the second optical connector are multiple-fiber connectors.

* * * * *